(12) United States Patent
Marchand

(10) Patent No.: US 8,354,759 B2
(45) Date of Patent: Jan. 15, 2013

(54) WIND POWERED APPARATUS HAVING COUNTER ROTATING BLADES

(75) Inventor: Harold Marchand, Sarnia (CA)

(73) Assignee: Biro Air Energy Inc., Sarnia (CA)

( * ) Notice: Subject to any disclaimer, the term of this patent is extended or adjusted under 35 U.S.C. 154(b) by 0 days.

(21) Appl. No.: 13/123,521

(22) PCT Filed: Oct. 9, 2009

(86) PCT No.: PCT/CA2009/001444
§ 371 (c)(1),
(2), (4) Date: Apr. 8, 2011

(87) PCT Pub. No.: WO2010/040229
PCT Pub. Date: Apr. 15, 2010

(65) Prior Publication Data
US 2011/0272951 A1 Nov. 10, 2011

Related U.S. Application Data

(60) Provisional application No. 61/103,932, filed on Oct. 9, 2008.

(51) Int. Cl.
*H02K 9/04* (2006.01)
(52) U.S. Cl. ............................................. 290/55; 290/44
(58) Field of Classification Search ...................... 290/44, 290/55
See application file for complete search history.

(56) References Cited

U.S. PATENT DOCUMENTS

| | | | | |
|---|---|---|---|---|
| 2,153,523 A | * | 4/1939 | Edmonds et al. ................ | 290/55 |
| 2,177,801 A | * | 10/1939 | Erren .............................. | 290/55 |
| 3,974,396 A | | 8/1976 | Schonball | |
| 4,039,848 A | * | 8/1977 | Winderl ........................... | 290/55 |
| 4,061,926 A | | 12/1977 | Peed | |
| 4,065,225 A | * | 12/1977 | Allison .......................... | 416/121 |
| 4,087,196 A | | 5/1978 | Kronmiller | |
| 4,213,057 A | | 7/1980 | Are | |
| 5,506,453 A | | 4/1996 | McCombs | |
| 5,876,181 A | | 3/1999 | Shin | |
| 6,127,739 A | | 10/2000 | Appa | |
| 6,278,197 B1 | | 8/2001 | Appa | |
| 6,476,513 B1 | * | 11/2002 | Gueorguiev .................... | 290/55 |

(Continued)

FOREIGN PATENT DOCUMENTS

| | | |
|---|---|---|
| DE | 4444757 A1 | 6/1996 |
| GB | 758628 | 12/1953 |
| GB | 758628 A * | 10/1956 |
| WO | 9600349 A1 | 1/1996 |
| WO | 2007147641 | 12/2007 |

OTHER PUBLICATIONS

PCT/ISA/210 International Search Report.

(Continued)

*Primary Examiner* — Julio Gonzalez
*Assistant Examiner* — Stefan Mikailoff
(74) *Attorney, Agent, or Firm* — Brunet & Co. Ltd.; Robert A. H. Brunet

(57) ABSTRACT

A wind powered apparatus (or wind turbine) having two sets of counter rotating blades. Both sets of blades are connected to an alternator and are operable to rotate the stator and rotor thereof in opposite directions relative to one another, thereby doubling their relative speed. The apparatus is equipped with a conical front nose piece having a blunt tip that co-operates with the first and second sets of blades to improve performance of the apparatus by affecting its orientation and the rotational speed of the blades.

16 Claims, 16 Drawing Sheets

U.S. PATENT DOCUMENTS

| | | | |
|---|---|---|---|
| 6,504,260 B1 | 1/2003 | Debleser | |
| 7,014,416 B2 | 3/2006 | Lund | |
| 7,384,239 B2 * | 6/2008 | Wacinski | 416/128 |
| 7,582,981 B1 * | 9/2009 | Meller | 290/44 |
| 2004/0096327 A1 | 5/2004 | Appa | |
| 2005/0214119 A1 * | 9/2005 | Miller | 416/126 |
| 2006/0291993 A1 | 12/2006 | Johnson | |
| 2008/0197639 A1 * | 8/2008 | Brander | 290/55 |
| 2009/0160194 A1 | 6/2009 | Clark | |
| 2009/0191064 A1 | 7/2009 | Herr | |

OTHER PUBLICATIONS

PCT/ISA/237, Written Opinion of the International Searching Authority.

van der Elst, W.J.; "The aerodynamics of contra-rotating axial flow wind power turbines", CSIR Report ME 1638, Nov. 1979, Council for Scientific and Industrial Research, National Mechanical Engineering Research Institute, Aeromechanics Division, Pretoria, South Africa.

* cited by examiner

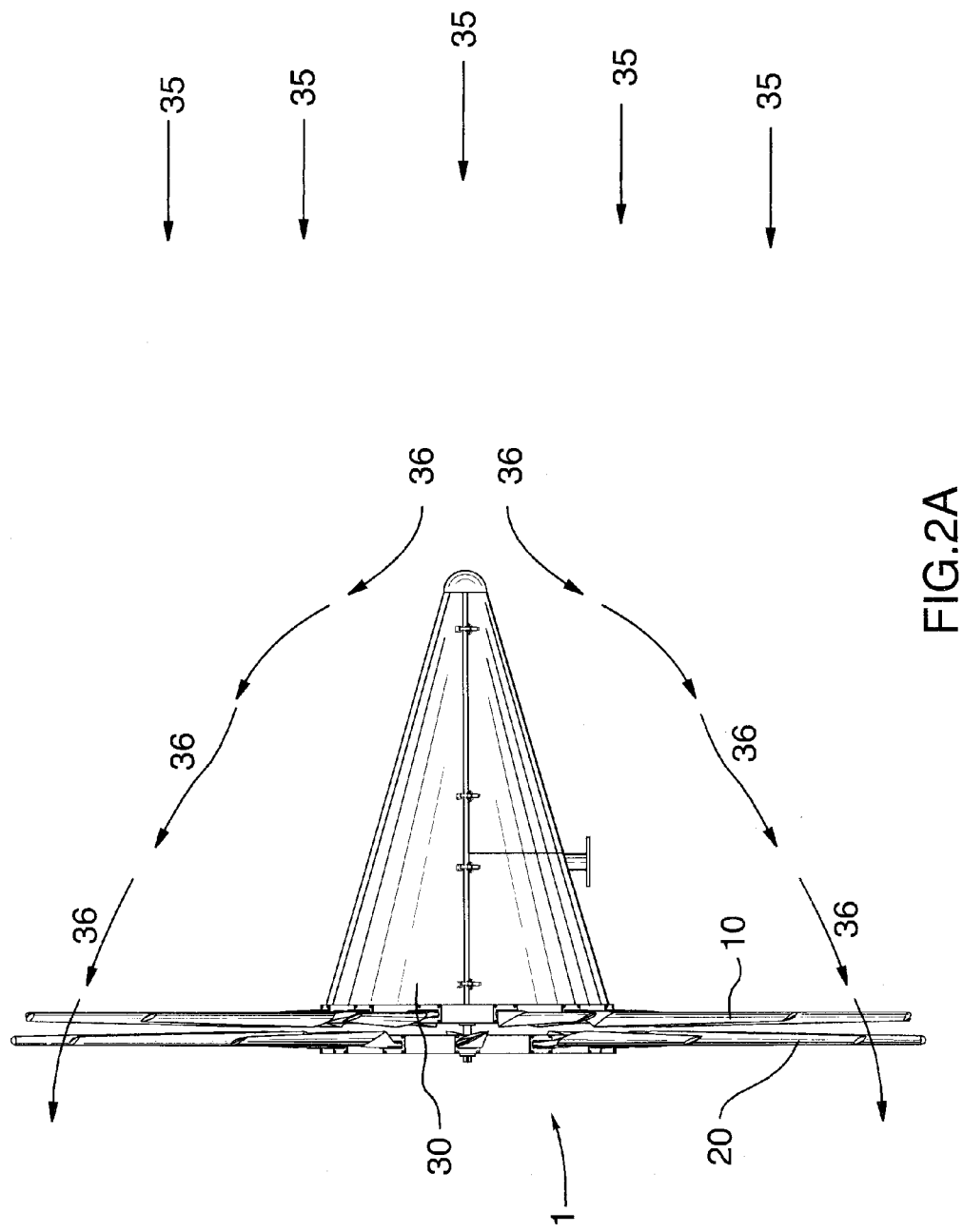

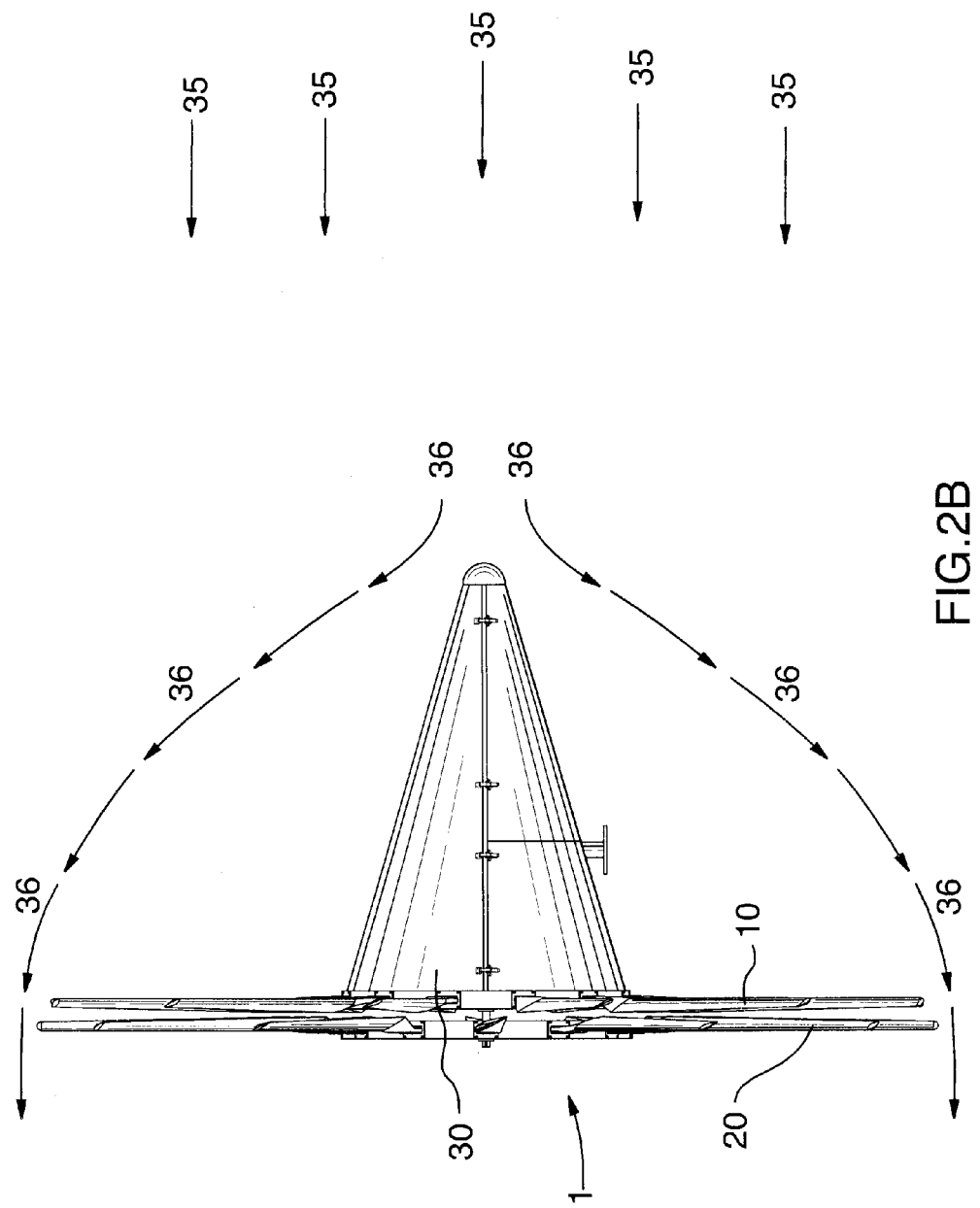

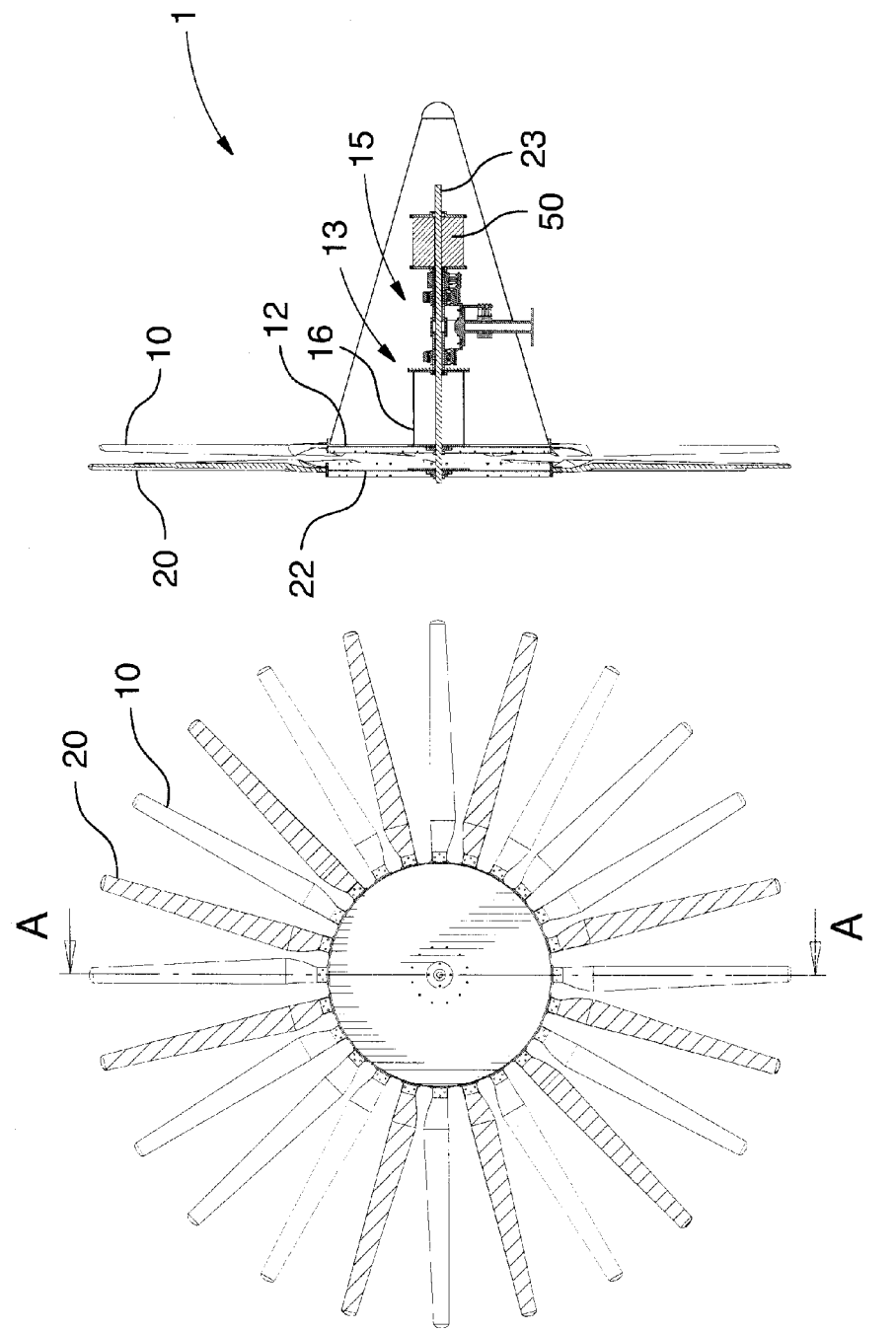

WIND POWERED APPARATUS HAVING COUNTER ROTATING BLADES

CROSS-REFERENCE TO RELATED APPLICATION

This application is a national entry under 35 U.S.C. 371 of PCT/CA2009/001444, filed Oct. 9, 2009, which claims the benefit of U.S. patent application 61/103,932, filed Oct. 9, 2008, which is incorporated herein by reference.

FIELD OF THE INVENTION

The invention relates to a wind powered apparatus (or wind turbine) having two sets of counter rotating blades. More particularly, the invention relates to a wind powered apparatus equipped with an electricity generating means having a stator and rotor that rotate in opposite directions relative to one another. The wind turbine is further equipped with a front nose piece that co-operates with the blades to improve performance by orienting the apparatus into the wind and/or affecting the rotational speed of the blades.

BACKGROUND

Wind powered apparatus, also known as windmills or wind turbines, have been used for a variety of applications including pumping water, grinding grain, and generating electricity. For all of these applications, it is desirable to improve the performance of the apparatus.

For horizontal axis wind turbines (HAWT's), it is important that the apparatus includes a means for orienting it into the wind. Although one method of accomplishing this is by adding a tail to the turbine rearward of the blades, a tail can be exposed to turbulence in the wake of the blades and be slow to react to minor changes in wind direction. It would therefore be desirable to improve performance by providing a method for operating the apparatus that includes orienting the apparatus into the wind, desirably without the use of a tail.

A problem encountered by wind turbines is the need to prevent unacceptably high rotational speeds during extreme wind conditions. Although one method of accomplishing this is by adding a brake to the apparatus, this introduces mechanical complexity and a potential failure mode for the apparatus. It would therefore be desirable to improve performance by providing a method for operating the apparatus that includes limiting the maximum rotational speed of the blades.

Another problem encountered with electricity generating wind power apparatus is the relatively high minimum speed that is required before electricity generation can begin without stalling the apparatus. It would be desirable to improve performance by lowering the minimum wind velocity required for a given electrical output from the apparatus.

Yet another problem encountered with many commercial scale wind turbines is the lack of ability to rotate completely (360°) about their vertical axis to accommodate changes in wind direction. Although it would be desirable to provide such complete rotation, factors such as the twisting of electrical power wires typically render this option unavailable. A related side effect is that a turbine at the extremity of its rotational movement can sometimes lack the ability to maintain orientation into the wind and, as a result, can become locked in a non-power generating position without the ability to turn back in to the wind. It would therefore be desirable to provide a wind powered apparatus capable of complete 360° rotational movement about its vertical axis.

It is desirable to achieve these improvements in a low cost and reliable manner.

The need therefore exists for an improved wind powered apparatus that addresses some or all of these deficiencies in the art and/or achieves some or all of the above-noted desirable improvements.

SUMMARY OF THE INVENTION

According to the present invention, there is provided a wind powered apparatus having a front for orientation into the wind and a rear, the apparatus comprising: a front nose piece; a first set of blades rearward of the nose piece that rotates in a first direction about a horizontal axis; and, a second set of blades rearward of the first set of blades that rotates in a second direction about the horizontal axis, the second direction opposite to the first direction. Both the first and second sets of blades may be operatively connected to a generator for producing electricity. The nose piece may co-operate with the first and second sets of blades to improve performance by orienting the apparatus and/or by affecting the rotational speed of the first and second sets of blades.

The nose piece may be generally conical in shape. The nose piece may comprise a blunt front tip, which may be a rounded tip and/or may comprise a substantially hemispherical dome. The nose piece may comprise a frusto-conical body and a blunt front tip. The frusto-conical body may have a first or front end having a first diameter and a rear or second end having a second diameter larger than the first diameter. The ratio of the first diameter to the second diameter may be in the range of from 0.05 to 0.45, preferably 0.10 to 0.30, more preferably 0.12 to 0.25, yet more preferably 0.15 to 0.20. The frusto-conical body may have a length and the ratio of the length to the second diameter may be from 1 to 3, preferably from 1.25 to 2.5, more preferably from 1.5 to 2.0. The first set of blades may have a diameter and the ratio of the diameter of the first set of blades to the second diameter of the frusto-conical body may be from 2 to 7, preferably from 2.25 to 6, more preferably from 2.5 to 5, yet more preferably from 2.75 to 4, even more preferably from 3 to 3.5. The blunt front tip may have a length and a diameter equal to the diameter of the first end of the frusto-conical body. The ratio between the length of the blunt front tip to the diameter of the blunt front tip may be from 0.1 to 1.5, preferably from 0.2 to 1.0, more preferably from 0.3 to 0.7, even more preferably from 0.4 to 0.6, still more preferably from 0.51 to 0.59.

The frusto-conical body may have a slightly oval cross-sectional shape, with the length (longer axis) of the oval oriented horizontally and with the width (shorter axis) of the oval oriented vertically. The length of the oval is from 1 to 15% larger than the width of the oval, preferably from 1 to 10% larger, more preferably from 5 to 10% larger. For determining ratios between relative dimensions of the apparatus, an average of the length and width of the oval can be used to determine the diameter of the first or second ends.

The second set of blades may have a diameter equal to that of the first set of blades. Alternatively, the second set of blades may have a diameter greater than that of the first set of blades. The first set of blades may comprise at least five blades, preferably from 5 to 15 blades, more preferably from 6 to 13 blades, yet more preferably from 7 to 12 blades. The second set of blades may comprise at least five blades, preferably from 5 to 15 blades, more preferably from 6 to 13 blades, yet more preferably from 7 to 12 blades. The first and/or second sets of blades may each comprise a number of blades independently selected from 5, 6, 7, 8, 9, 10, 11, 12, 13, 14 or 15 blades. The number of blades in the first and second sets may be equal, or the number of blades in the second set may be different from the number of blades in the first set.

The blades in the first and second sets may be equal in length or different in length. The blades in the second set may be longer than the blades in the first set. The shape of the blades in the first and second sets may be mirror images of one another (in order to induce rotation of their respective hubs in opposite directions), or the blades in the first and second sets may have different shapes, provided that the shape and/or mounting orientation chosen for each set still cause the hubs to rotate in opposite directions. The first and/or second sets of blades may have a constant pitch. The second set of blades may be immediately rearward of the first set of blades, meaning that there is no intervening structure (other than the second shaft) located between the first and second sets of blades. The first and/or second sets of blades may be airfoils. The apparatus may not comprise a tail rearward of the second set of blades.

The first and second sets of blades may be operatively connected to an electricity generating means. The electricity generating means may generate AC or DC electricity. The electricity generating means may comprise an alternator. The electricity generating means may be located in front of the first and second sets of blades within an interior of the nose piece. The electricity generating means may be sized according to the geometry of the apparatus and its power generating capability as a function of available wind energy. For example, the generating means may be rated to deliver a maximum power of from 0.1 to 25 kW, preferably 2 to 20 kW, more preferably from 5 to 18 kW, yet more preferably from 6 to 16 kW, even more preferably from 6.5 to 10 kW.

The apparatus may further comprise a central shaft (which includes a pair of shafts) concentric with the horizontal axis and connecting the first set of blades, the second set of blades and the electricity generating means. The central shaft may comprise a first shaft that has a hollow cross-sectional shape and a second shaft journaled within the first shaft, the first shaft rotatable in the first direction and the second shaft rotatable in the second direction. The first set of blades may be connected to the first shaft and the second set of blades may be connected to the second shaft. The electricity generating means may be connected to both the first and second shafts. The electricity generating means may comprise a stator and a rotor, each of which is mutually exclusively connected to either the first or second shafts for concentric rotational movement in opposite directions relative to one another. This has the effect of doubling the relative speed of movement between the stator and rotor.

The electricity generating means may comprise a first rotational power coupling. The first rotational power coupling may be external to the electricity generating means and may comprise a set of slip rings mounted to the first shaft or to the exterior of the electricity generating means concentric with the stator and rotor (i.e. concentric with the horizontal axis) and may further comprise a set of brushes slidingly engaged in electrical contact with the slip rings.

The apparatus may further comprise a mounting means for mounting the apparatus to a vertical support structure. The mounting means may permit 360° rotational movement of the apparatus about a vertical axis of the mounting means. The mounting means may permit unlimited rotational movement about the vertical axis. The mounting means may permit a plurality of complete rotations about the vertical axis. The apparatus may further comprise a second rotational power coupling concentric with the vertical axis.

During operation, the nose piece may co-operate with at least the first set of blades or the first and second sets of blades to improve performance of the apparatus as compared with absence of the nose piece. The improvement in performance may comprise orienting the apparatus, for example by turning the nose piece into the wind, particularly by turning the blunt front tip of the nose piece into the wind. The improvement in performance may comprise affecting a rotational speed of the first and second sets of blades, for example by deflecting wind past the blades to thereby limit the rotational speed of the blades when the wind velocity exceeds a pre-determined value. The pre-determined value may be 40 mph (64 km/h), 45 mph (72 km/h), 47 mph (76 km/h), 50 mph (80 km/h), 52 mph (84 km/h), 55 mph (89 km/h), 57 mph (92 km/h), 60 mph (97 km/h), 62 mph (100 km/h), 65 mph (105 km/h), 67 mph (108 km/h), 70 mph (113/km/h), 72 mph (116 km/h) or 75 mph (121 km/h). The pre-determined value may be a function of the number of blades in the first set of blades, the second set of blades, or the first and second sets of blades. Affecting the rotational speed may comprise increasing the rotational speed as compared with absence of the nose piece, particularly at lower wind velocities, for example 5-25 mph (8-40 km/h), 7-20 mph (11-32 km/h) or 10-15 mph (16-24 km/h).

According to another aspect of the present invention, there is provided a method of operating a wind powered apparatus comprising a first set of blades, a second set of blades, and a nose piece upwind of the first and second sets of blades, the method comprising allowing the nose piece to co-operate with at least the first set of blades to improve performance of the apparatus. Improving performance may comprise orienting the nose piece into the wind or affecting the rotational speed of the first and second sets of blades, as previously described.

BRIEF DESCRIPTION OF THE DRAWINGS

Having summarized the invention, preferred embodiments thereof will now be described with reference to the figures, in which:

FIG. 2A is a side view of the embodiment of FIG. 1*a* schematically showing air flow at a first (lower) wind velocity;

FIG. 2B is a side view of the embodiment of FIG. 1*a* schematically showing air flow at a second (higher) wind velocity;

FIG. 4A is a front view of the embodiment of FIG. 1*a,* showing a vertical section line A-A;

FIG. 4B is a side sectional view of the apparatus along the section line A-A shown in FIG. 4*a;*

FIG. 6A is a cross-sectional view of an electricity generating means suitable for use in any of the foregoing embodiments of the present invention; and, FIG. 6B is an end view of the electricity generating means of FIG. 6a.

DETAILED DESCRIPTION

Figure 1A:
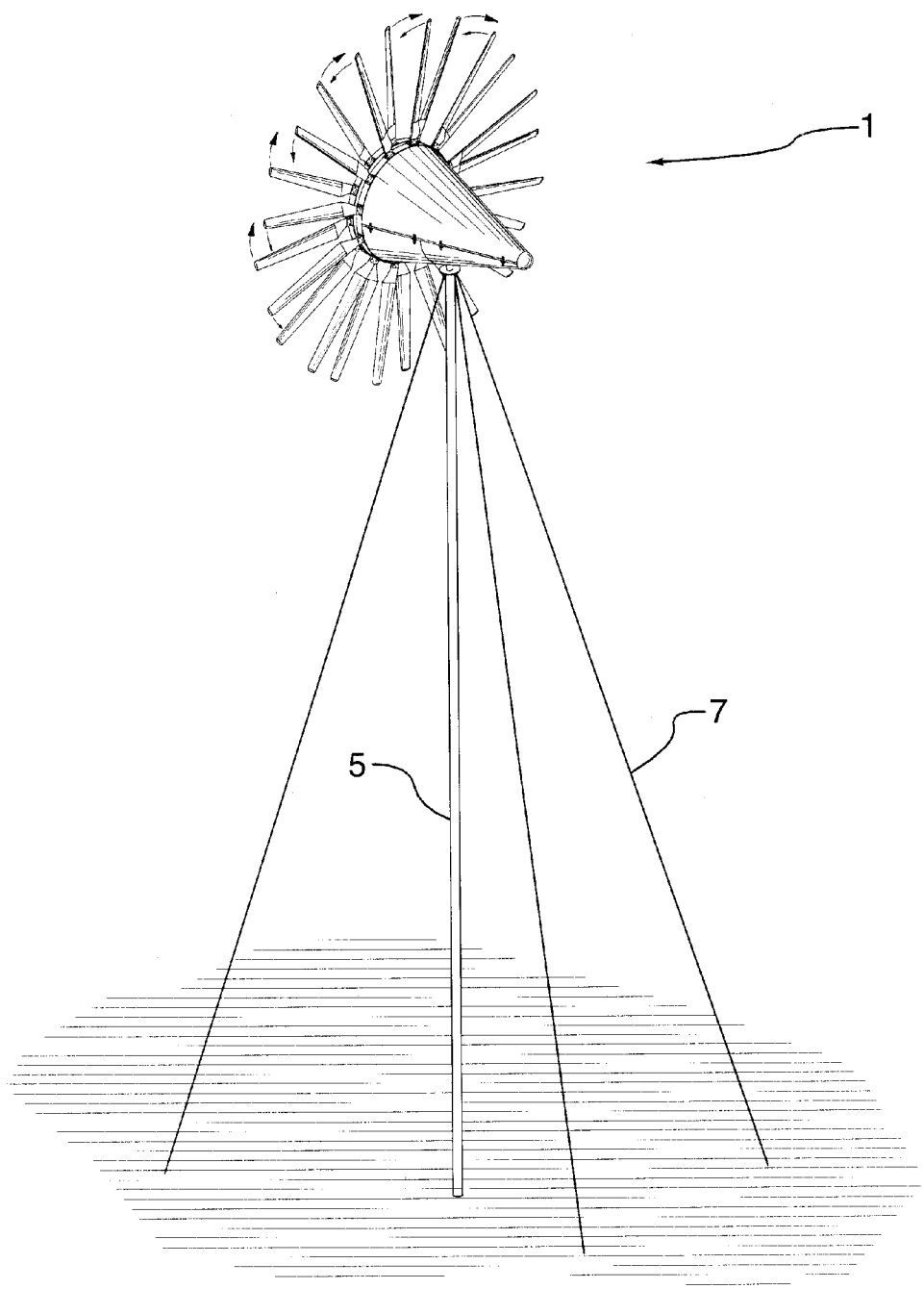
FIG. 1A is a perspective view of a first embodiment of a wind powered apparatus according to the present invention mounted to a pole and equipped with stabilizing guy wires.
Figure 1B:
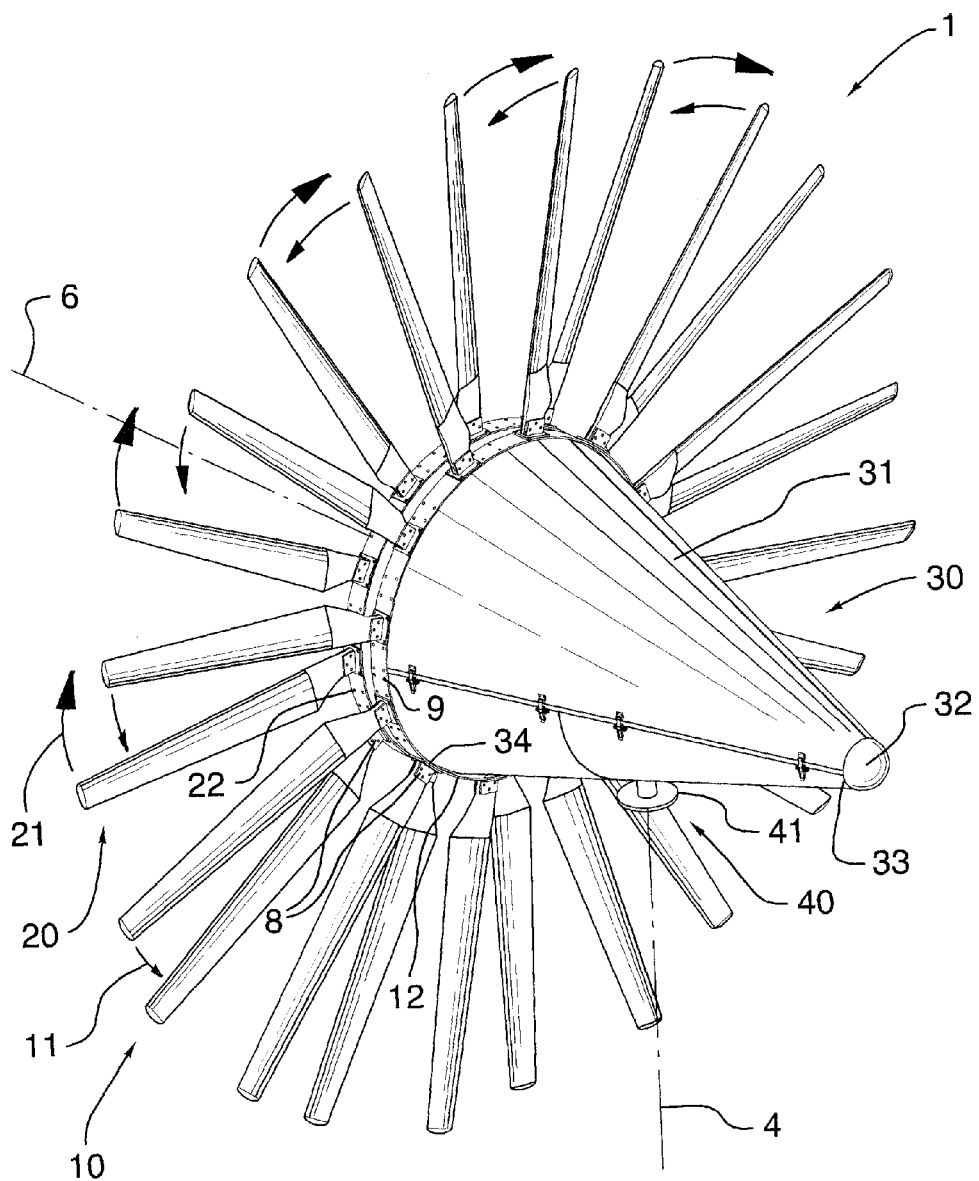
FIG. 1B is an enlarged perspective view of the embodiment shown in FIG. 1*a;*

Referring to FIG. 1A, a wind powered apparatus 1 according to the present invention is shown in perspective view. The apparatus 1 is shown mounted atop a pole 5 that is stabilized with guy wires 7; although this is a preferred mounting method due to simplicity, many other mounting methods will be readily apparent to persons skilled in the art. Referring additionally to FIG. 1B, a portion of a mounting means 40 is shown protruding from beneath the apparatus 1 that includes a flange 41 that facilitates attachment of the apparatus 1 to the pole 5. The mounting means 40 permits complete continuous rotation about a vertical axis 4 passing through the mounting means 40. The vertical axis 4 is preferably also aligned with the pole 5, but need not necessarily be so aligned, particularly if alternative mounting configurations are chosen.

The apparatus includes a first set of blades 10, shown rotating in a first direction 11 about a horizontal axis 6 and a second set of blades 20, shown rotating in a second direction 21 about the horizontal axis 6 that is opposite to the first direction 11. Persons skilled in the art will recognize that by inverting the angle of the first and second sets of blades 10, 20, the first and second directions of rotation 11, 21 may also be inverted. This arrangement of bi-rotational or contra-rotating sets of blades, wherein a second set of blades is provided immediately 'downwind' or rearward of a first set of blades, allows for recovery of energy lost in the swirling motion of the air in the slipstream of the first set of blades. Contra-rotation also advantageously increases power without increasing overall diameter and balances out the torque effects and gyroscopic precession effects of a single set of blades.

The first set of blades 10 is mounted to a first hub 12 and the second set of blades 20 is mounted to a second hub 22. Each blade in the first and second sets of blades 10, 20 is secured to its respective hub 12, 22 by a blade mount 8. The blade mount 8 allows the blades 10, 20 to be readily removed from the apparatus for any required maintenance or replacement and, by providing a number of different configurations for mounting holes 9 in the first and second hubs 12, 22, also allows for the number of blades and/or radial position of the blades to be adjusted as may be required in response to site-specific wind conditions. A conical nose piece 30 is provided at the front of the apparatus (upwind of the blades) and comprises a frusto-conical body 31 and a blunt tip 32 that is rounded (generally hemispherical). The rounded blunt tip 32 may be referred to as a "bull nosed" tip. The frusto-conical body 31 comprises a first body end 33, having a first body diameter that is the same as that of the blunt tip 32, and a second body end 34, having a second body diameter that is larger than the first body diameter. The geometry and function of the nose piece 30 will be described in greater detail hereinafter.

Referring to FIG. 2A, without wishing to be limited by theory, the nose piece 30 is designed to deflect the oncoming wind 35 outwardly of the nose piece, as shown by arrows 36, towards the tips of the first and second sets of blades, 10, 20. The nose piece 30 therefore is designed to work in co-operation with the first and second sets of blades 10, 20, in an effort to advantageously improve performance of the apparatus 1, particularly in relatively low wind velocity conditions. Since the majority of the torque extracted from the wind is provided by the wind passing over the outer ends of the blades 10, 20, increasing the local wind velocity near the outer ends can improve performance. An added advantage of this deflection is that in relatively higher wind velocities, above a pre-determined upper wind velocity, the wind begins to be deflected outwardly past the tips of the blades, as illustrated in FIG. 2B. This has the effect of reducing the rate of increase in rotational speed of the blades 10, 20 as wind velocity increases until eventually a maximum speed is reached and then, at wind velocities above the pre-determined upper wind velocity, the rotational speed of the blades 10, 20 is reduced, thereby automatically limiting the maximum rotational speed. This is advantageous in reducing or preventing the onset of dangerous rotational speed conditions during extreme winds, which can pose a safety problem in conventional wind turbine installations. By careful design of the apparatus 1, it is possible to eliminate altogether the need for a brake mechanism (or its equivalent) that engages during high winds to prevent dangerous speed conditions; however, a safety brake may still be provided as a matter of choice for peace of mind and in compliance with local rules and regulations.

In order to achieve one or both of the advantages of improved low wind velocity performance and automatically limiting maximum rotational speed, the nose piece 30 is designed in co-operation with at least the first set of blades and preferably the first and second sets of blades. The number of blades and the shape of the blades, including blade angle, in each of the first and second sets of blades 10, 20 determine the resistance to air flow created by the apparatus 1. With all other parameters being kept constant, in general a greater number of blades creates a greater resistance to air flow. This resistance to air flow causes a pressure gradient ahead of the first and second sets of blades, (which is a function of wind velocity) that co-operates with the nose piece 30 to affect the overall performance of the apparatus 1. Providing the two sets of blades 10, 20 significantly affects this pressure gradient, as compared with having only the first set of blades 10 present. Therefore, the geometry of the nose piece 30 is determined in conjunction with the number of blades in each set 10, 20 and the geometry of the blades in order to achieve deflection past the blades at or above the pre-determined upper wind velocity.

There are many combinations of the geometric parameters of the nose piece 30 and first and second sets of blades 10, 20 that can be used to achieve these preferred functions of the present invention. Two combinations are outlined below in Table 1, the first embodiment having a first pre-determined value for upper wind velocity and the second embodiment having a second, higher pre-determined value for upper wind velocity.

TABLE 1

Experimentally derived geometric relationships

| Parameter | Emb. 1 | Emb. 2 |
|---|---|---|
| Number of blades in each of first and second sets of blades | 12 | 12 |
| First body diameter to second body diameter | 0.16 | 0.14 |
| Length of frusto-conical body to second body diameter | 1.53 | 1.41 |
| Diameter of first set of blades to second body diameter | 3.28 | 2.75 |
| Length of blunt tip to diameter of blunt tip | 0.57 | 0.50 |

Persons skilled in the art will recognize that, to lengthen the blades and thereby produce more power at a given wind velocity, a number of changes to the geometry of the nose piece can be made to maintain the desired improvements in performance described above. For example, when the ratio between the diameter of the first or second sets of blades and the second body diameter increases, the following actions may be taken to maintain performance: the diameter of the first end 33 may become smaller relative to the second end 34 or the diameter of the second end 34 may become larger relative to the first end 33, thereby leading to a decrease in the ratio between the first body diameter and second body diameter; the length of the frusto-conical body 31 may become shorter relative to the second body diameter, thereby leading to a decrease in the ratio of the length of the frusto-conical body 31 to the second body diameter; the diameter of the blunt tip 32 may become larger relative to the length of the blunt tip 32, thereby leading to a decrease in the length to diameter ratio of the blunt tip 32; or, a combination of the above parameters may be employed to achieve similar desired performance objectives from the apparatus. Of course, if the performance objectives change (i.e. the pre-determined value for upper wind velocity changes or the desired low wind velocity performance changes), then the above options need not apply.

Without wishing to be limited by theory, it is believed that the blunt tip 32 is of particular significance in creating the desired wind deflection. In general, a blunt tip 32 has the effect of deflecting wind outwardly from the body of the nose piece 30, whereas a pointed tip is more streamlined and does not produce the same degree of wind deflection. Although blunt tips that are rounded are preferred, a blunt tip that is flat or that comprises a more sharply angled cone than the remainder of the frusto-conical body may also be used.

Figure 2C:
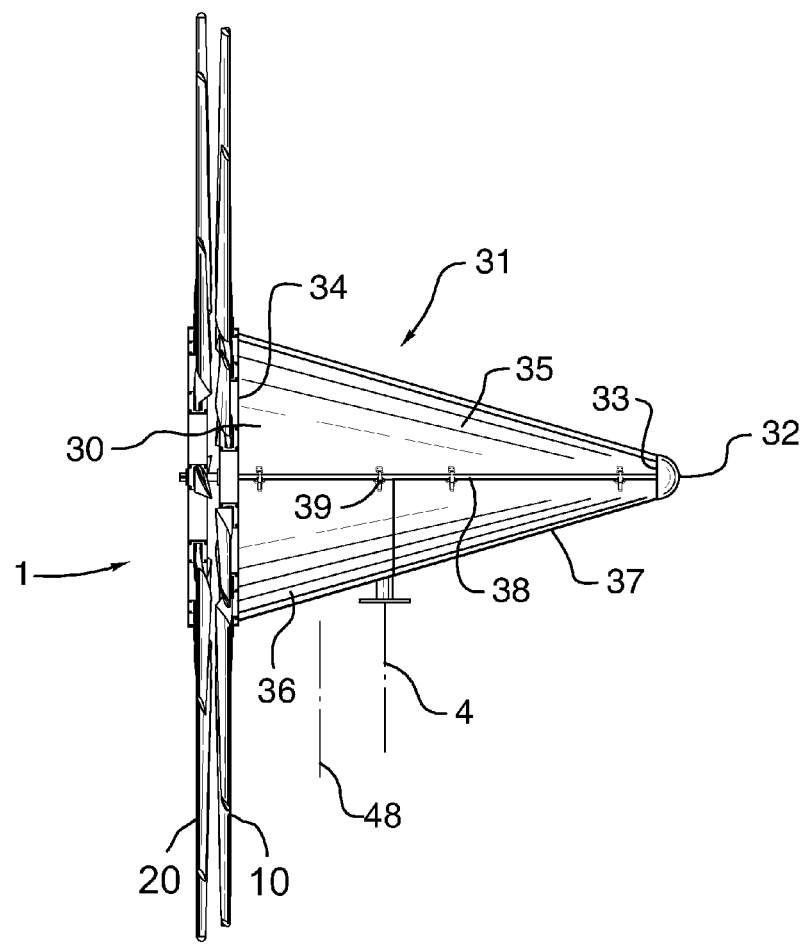
FIG. 2C is a side view of the embodiment of FIG. 1*a* showing the location of the vertical axis relative to the center of gravity of the apparatus.

The nose piece 30 is assembled from several separate pieces. Referring to FIG. 2C, the frusto-conical body 31 comprises a top portion 35, a bottom portion 36 and an access door 37. The top portion 35, bottom portion 36 and access door 37 are all mounted to a frame 38. The access door 37 and optionally the bottom portion 36 are removably mounted to the frame with latches 39 to facilitate access to the interior of the nose piece 30. The blunt tip 32 is also mounted to the frame 38. The frame 38 may be internal to the nose piece 30 or externally visible. The top portion 35, bottom portion 36 and/or blunt tip 32 may be bonded to one another for a seamless external appearance. Alternatively, the nose piece 30 may be composed of separate portions that are substantially abutted with one another. The separate portions may have a consistent angle or differing angles with respect the horizontal axis 6 when viewed in side profile.

Figure 5A:
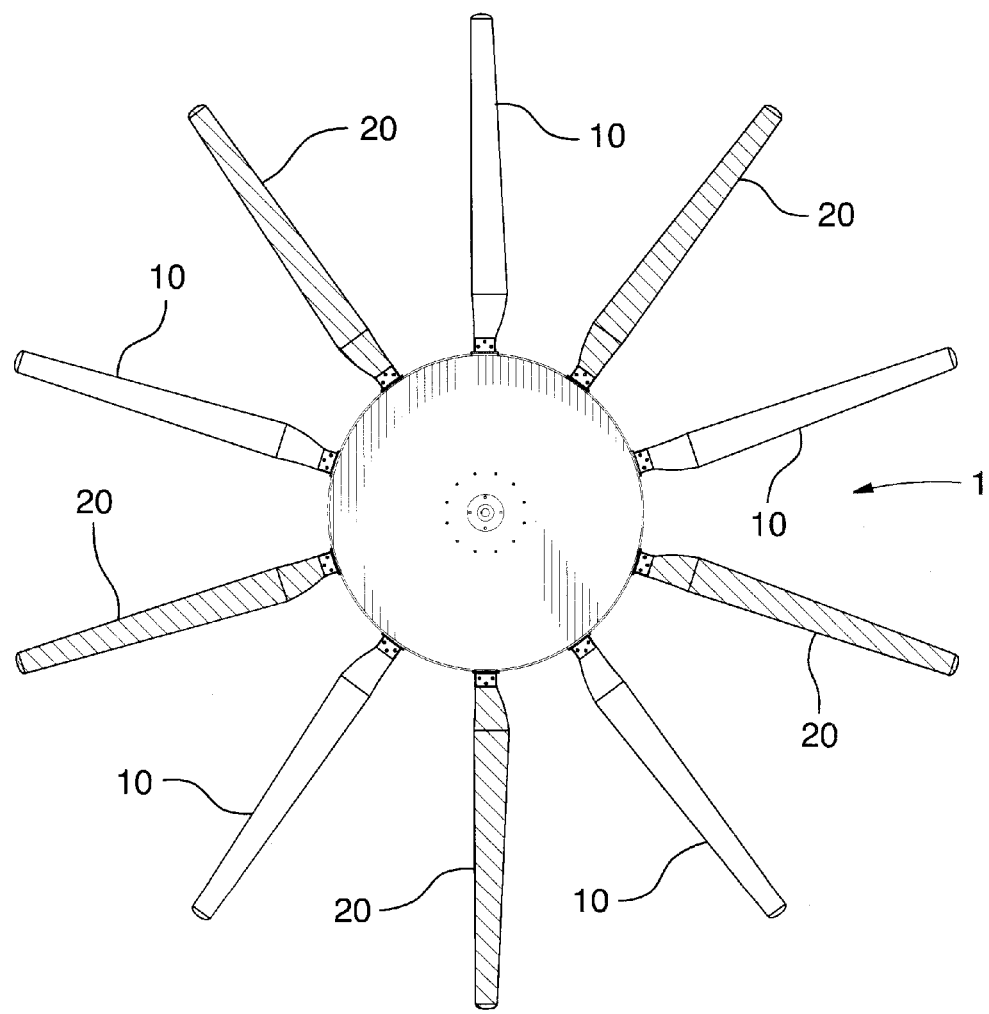
FIG. 5A is a front end view of a second embodiment of the apparatus having 5 blades in each of the first and second sets of blades.
Figure 5B:
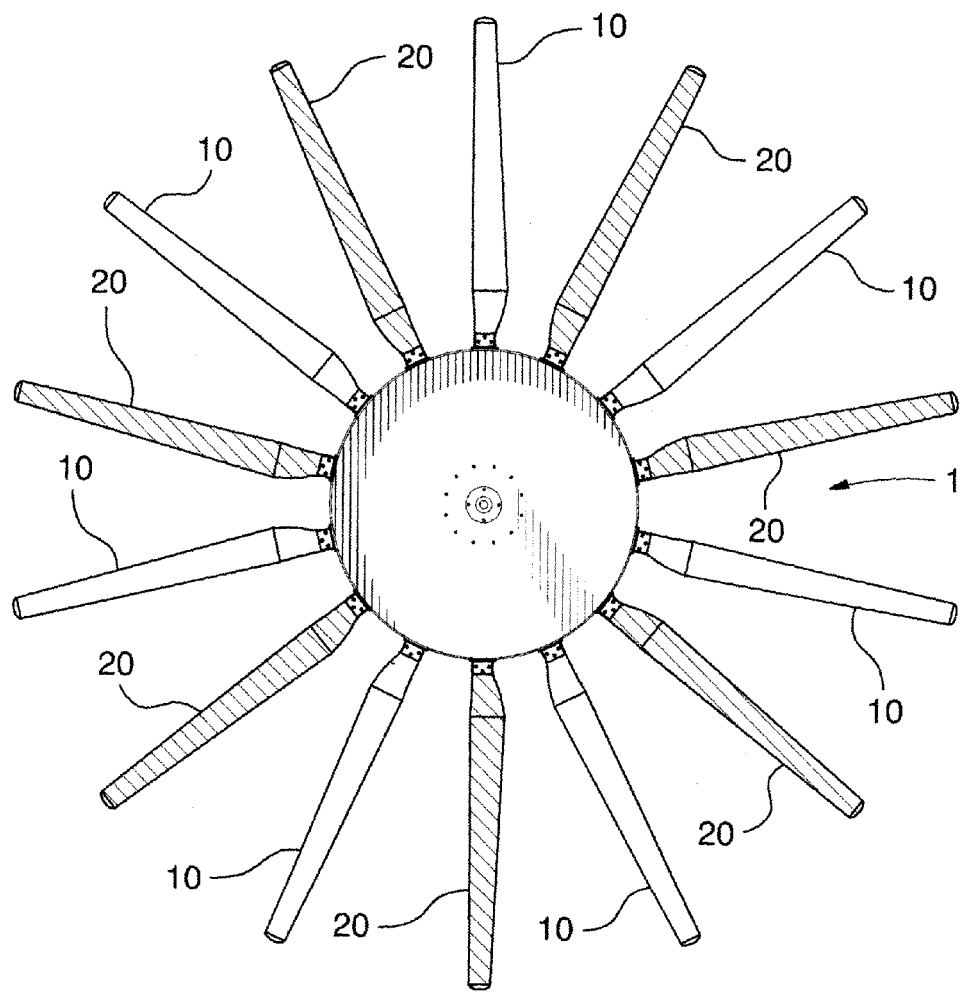
FIG. 5B is a front end view of a third embodiment of the apparatus having 7 blades in each of the first and second sets of blades.
Figure 5C:
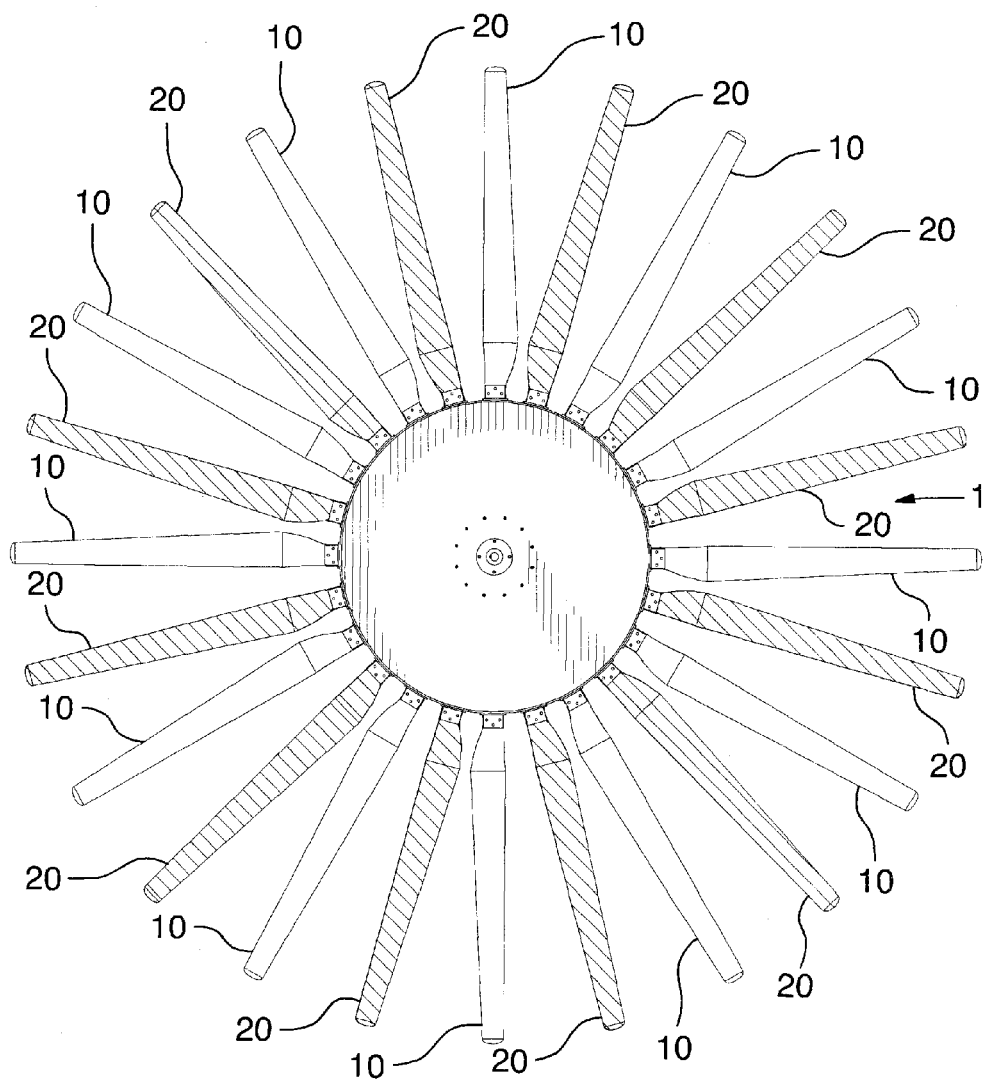
FIG. 5C is a front end view of the embodiment of the apparatus shown in FIG. 1a having 12 blades in each of the first and second sets of blades.
Figure 5D:
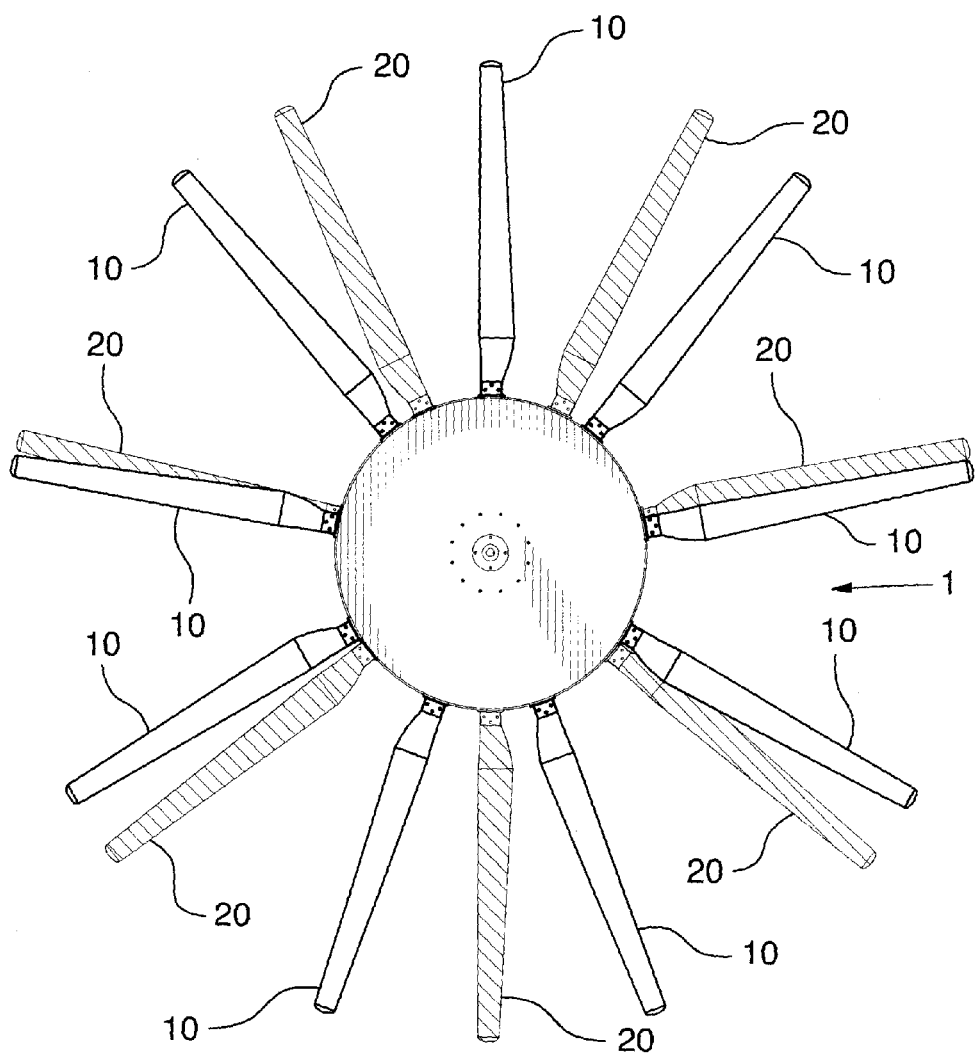
FIG. 5D is a front end view of a fourth embodiment of the apparatus having 9 blades in the first set of blades and 7 blades in the second sets of blades.

Referring to FIGS. 5A to 5D, the first and second sets of blades 10, 20 each comprise at least 5 blades. FIG. 5A shows an embodiment of an apparatus according to the invention wherein both the first and second sets of blades 10, 20 each comprise 5 blades of equal length. FIG. 5B shows an embodiment of an apparatus according to the invention wherein both the first and second sets of blades 10, 20 each comprise 7 blades of equal length. FIG. 5C shows an embodiment of an apparatus according to the invention wherein both the first and second sets of blades 10, 20 each comprise 12 blades of equal length. FIG. 5D shows an embodiment of an apparatus according to the invention wherein the first set of blades 10 comprises 9 blades and the second set of blades 20 comprises 7 blades that are longer than the blades in the first set 10. Any combination of elements of the configurations shown in FIGS. 5A to 5D is also contemplated as part of the present invention; for example, the number of blades in the first and second sets may be equal or non-equal and the blade lengths in the first and second sets may be equal or non-equal.

In general, there are two types of blades: airfoils and plates. The blades used in the present invention are all airfoil blades, as these are much more efficient than flat plates. The airfoil blades shown in the figures are specific examples of a preferred blade type. The relationships described herein for desired nose cone geometry and blade geometry are all with reference to the use of airfoil blades.

A surprising advantage provided by having the nose piece 30 in front of the first and second sets of blades 10, 20 is that the windmill automatically orients itself with the nose piece 30 facing into the direction of the wind, thereby obviating the need for a tail. The self-orienting characteristic of the windmill is surprising in that persons skilled in the art might expect the nose piece 30 to act like a tail and cause the wind turbine to invert, such that the second set of blades 20 is upwind of the first set of blades 10, or to spin uncontrollably about the vertical axis 4. However, this is surprisingly not the case. Referring again to FIG. 2C, without wishing to be limited by theory, it is believed that this behaviour occurs at least in part due to the location of the vertical pivot axis 4 of the mounting means 40, which is located ahead of the first and second sets of blades 10, 20 between the first and second body ends 33, 34 of the frusto-conical body 31, but closer to the second end 34. The location of the vertical pivot axis 4 is selected so as to be just forward of the center of gravity 48 of the apparatus. The distance between the pivot axis 4 and the center of gravity 48 is from 0.05 to 0.25 times the distance between the first and second body ends 33, 34. By having more of its mass rearward of the pivot axis 4, the apparatus maintains a steady orientation with fluctuations in wind direction and does not spin uncontrollably. Of course, the relative dimensions of the nose piece 30 and blades 10, 20 are also important. In general, the blunt tip 32 deflects wind away from the frusto-conical body 31 and towards the tips of the first and second sets of blades 10, 20, making the combined surface area of the blades the main determinant of orientation and urging the blades to maintain a perpendicular relationship with the oncoming wind direction.

Figure 3A:
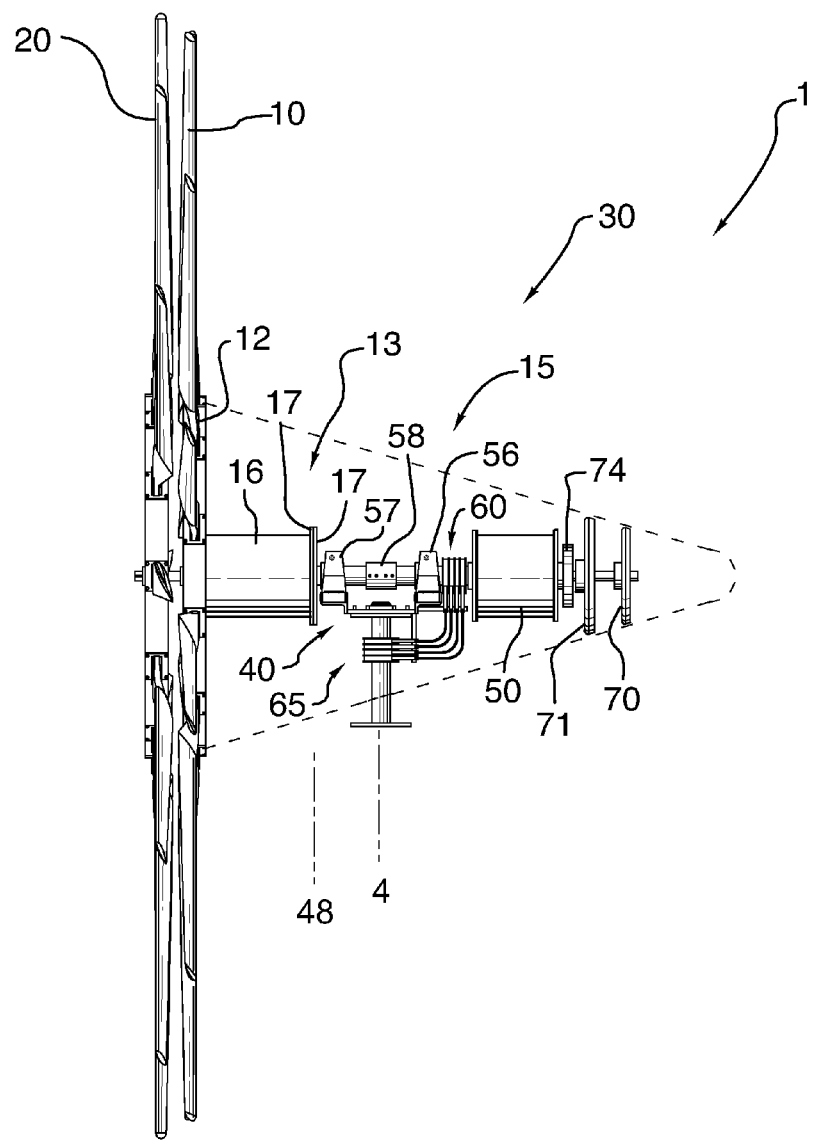
FIG. 3A is a side view of the embodiment of FIG. 1*a* with the nose piece illustrated transparently to reveal portions of the apparatus within an interior of the nose piece.

The apparatus of the present invention is advantageously used in the generation of electricity. To generate electricity, an electricity generating means is employed that comprises either a DC generator or an AC alternator, although an AC alternator is preferred. Referring to FIG. 3A, the apparatus 1 is shown in side view with the nose piece 30 transparent in order to expose the interior thereof. Within the interior of the nose piece 30 (in front of the first and second sets of blades 10, 20) is provided an electricity generating means comprising an alternator 50. As can be seen from the figure, the alternator 50 is located forward of the vertical pivot axis 4; this improves balance of the apparatus by offsetting the weight of the blades and hubs. The distance that the alternator 50 is located forward of the pivot axis 4 is a function of its weight and the weight of the components on the opposite side of the axis and may be selected to achieve a desired distance between the center of gravity 48 and the axis 4.

Also shown within the interior of the nose piece 30 are three optional items: a mechanical brake 70, a flywheel 71 and a synchronizer 74. Although not normally required, these items may optionally be provided in certain instances where wind conditions, apparatus design and/or local building codes make their use desirable. By locating these items forward of the vertical pivot axis 4, the balance of the apparatus is further improved by offsetting the weight of the blades and hubs, shifting ahead the center of gravity. The apparatus may also include a transformer and inverter for creating a desired voltage and/or frequency suitable for interconnection of the apparatus with dedicated electrical equipment, such as motors or batteries, or an electrical grid, such as found within a building or as provided by a utility company. It is understood that the apparatus includes ancillary equipment known by persons skilled in the art to be needed for safe interconnection of electricity generating equipment with electrical devices (e.g. breakers, safety disconnects, etc.) A lightning arrestor (not shown) is preferably provided to prevent damage to the apparatus and/or connected equipment in the event of a lightning strike.

Figure 3B:
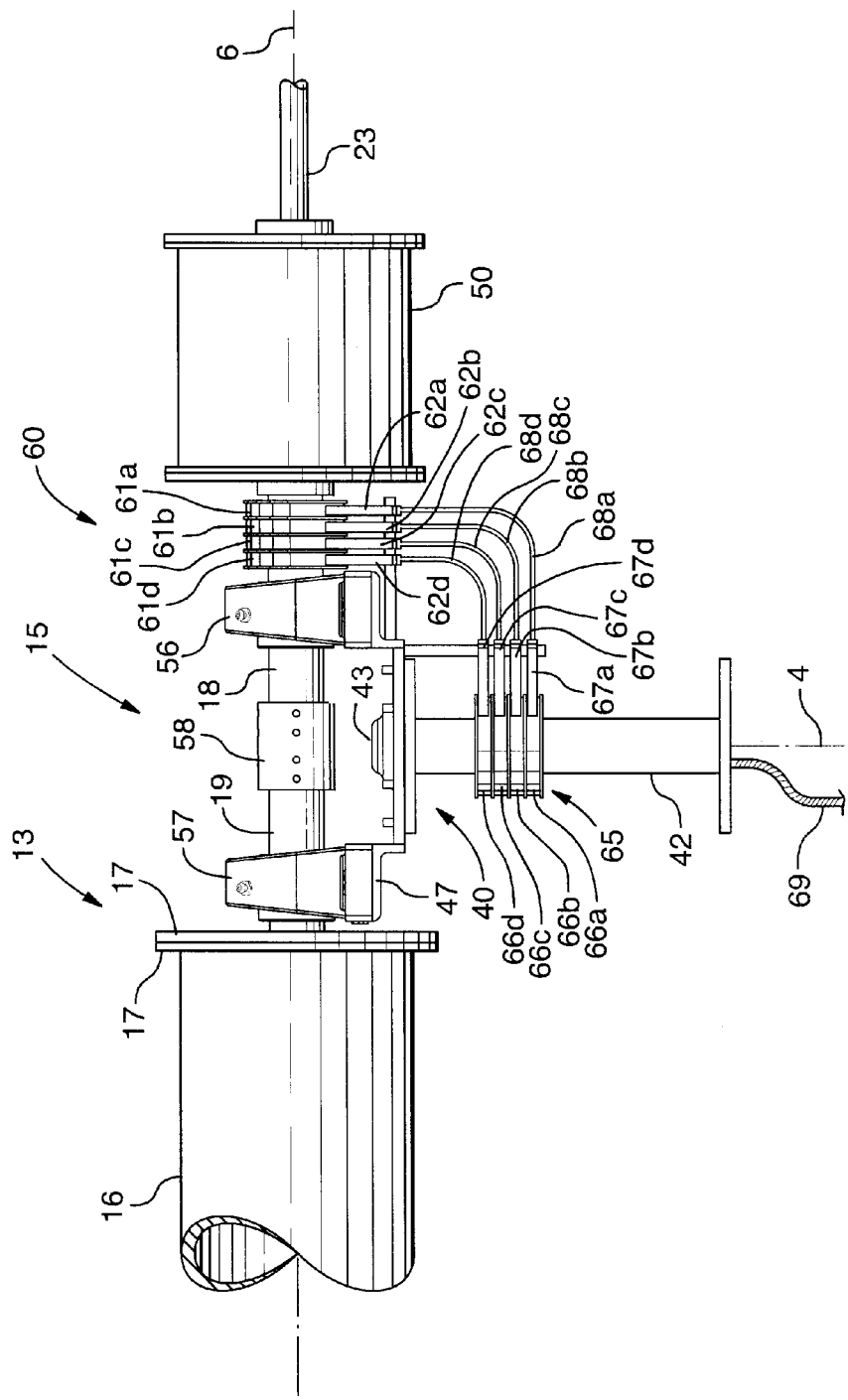
FIG. 3B in an enlarged view of the portions of the apparatus within the interior of the nose piece shown in FIG. 3*a;*

Referring additionally to FIG. 3B, the alternator 50 is mounted to a first shaft 13 having a second shaft 23 passing therethrough, both shafts being concentrically aligned with the horizontal axis 6. The first shaft 13 comprises a first section 15 and a second section 16 that has a large diameter relative to the first section 15. The large diameter provides the first shaft 13 with greater resistance to the torque transmitted by the first set of blades 10 through the first hub 12, to which the second section 16 is attached. The second section 16 is attached to the first section 15 by a pair of flanges 17 that are attached to one another and permit disassembly of the first shaft 13 in order to simplify manufacturing and maintenance. The first section 15 is journaled within a front bearing block 56 and a rear bearing block 57. A shaft coupler 58 is provided between the first and second bearing blocks 56, 57 to permit further disassembly of the first section 15 for manufacturing and maintenance purposes. The first and second bearing blocks 56, 57 are each mounted to a mounting plate 47 that is part of the mounting means 40. The mounting plate 47 is rotationally attached to a mounting shaft 42 via a mounting bearing 43. The entire apparatus 1 is thereby permitted to rotate about the vertical axis 4.

Figure 3C:
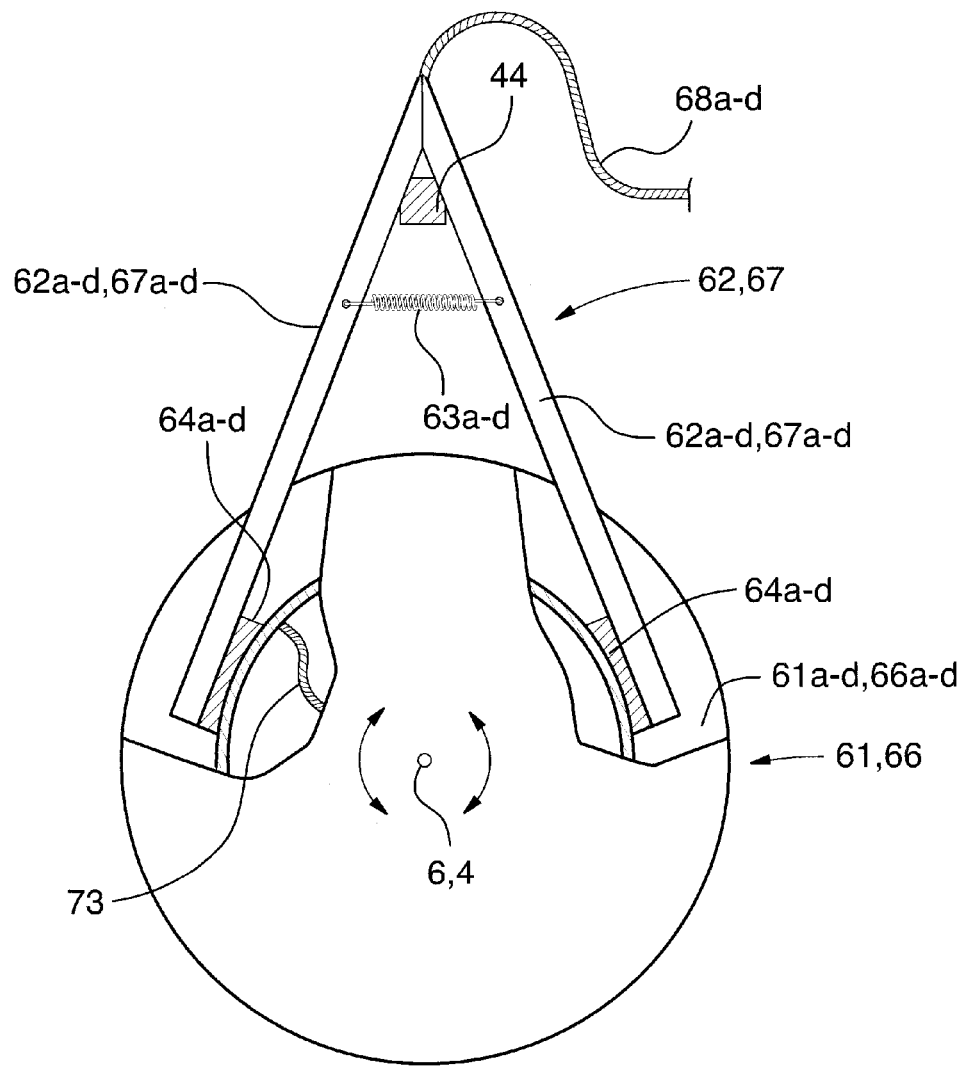
FIG. 3C is an enlarged view of a power coupling as illustrated in FIGS. 3*a* and 3*b;*

A first rotational power coupling 60 is provided within the interior of the nose piece 30 proximal the alternator 50 and a second rotational power coupling 65 is provided proximal the mounting means 40. Referring additionally to FIG. 3C, the first power coupling 60 comprises a first set of slip rings 61a-d in concentric alignment with the horizontal axis 6 and a first set of brushes 62a-d. The second power coupling 65 comprises a second set of slip rings 66a-d in concentric alignment with the vertical axis 4 and a second set of brushes 67a-d. Each of the brushes 62a-d, 67a-d are provided in sliding engagement within a complementary channel of each slip ring 61a-d, 66a-d, respectively. Each brush 62a-d, 67a-d comprises two halves connected to one another to form a V-shape that engages its respective channel on opposite sides of the horizontal or vertical axis 6, 4, respectively. The brushes 62a-d, 67a-d are each resiliently biased towards the slip rings 61a-d, 66a-d by internal springs 63a-d and equipped with end pads 64a-d making electrical contact with the slip rings 61a-d, 66a-d. The brushes 62a-d, 67a-d are fixedly connected to the mounting plate 47 by means of standoffs 44 and the slip rings 61a-d, 66a-d are fixedly connected to the first section 15 of the first shaft 13 and the mounting shaft 42, respectively. The first power coupling 60 is connected to the alternator 50 by alternator cable 72 (shown in FIG. 6A), which comprises four individual wires 73 that are independently connected to each slip ring 61a-d. The slip rings 61a-d are electrically isolated from one another. Each brush 62a-d of the first set of brushes 62 is electrically connected to a complementary brush 67a-d of the second set of brushes by means of coupling wires 68a-d. Each slip ring 66a-d is electrically isolated from one another and connected internally within the mounting shaft 42 to a separate wire of mounting cable 69, which in turn can be connected to an extension cable or bus passing through the pole 5 to ultimately permit interconnection of the alternator 50 with electrical equipment. The power couplings 60, 65 permit the alternator 50 to rotate endlessly about the horizontal axis 6 (by virtue of its attachment to the first shaft 13) and about the vertical axis 4 (by virtue of the mounting means 40) without twisting of wires 68, 73 or cables 72, 69. This in turn permits transfer of power from the alternator 50 to interconnected electrical equipment without the need for limiting the rotational movement of the apparatus 1 about the vertical axis 4.

Figure 4C:
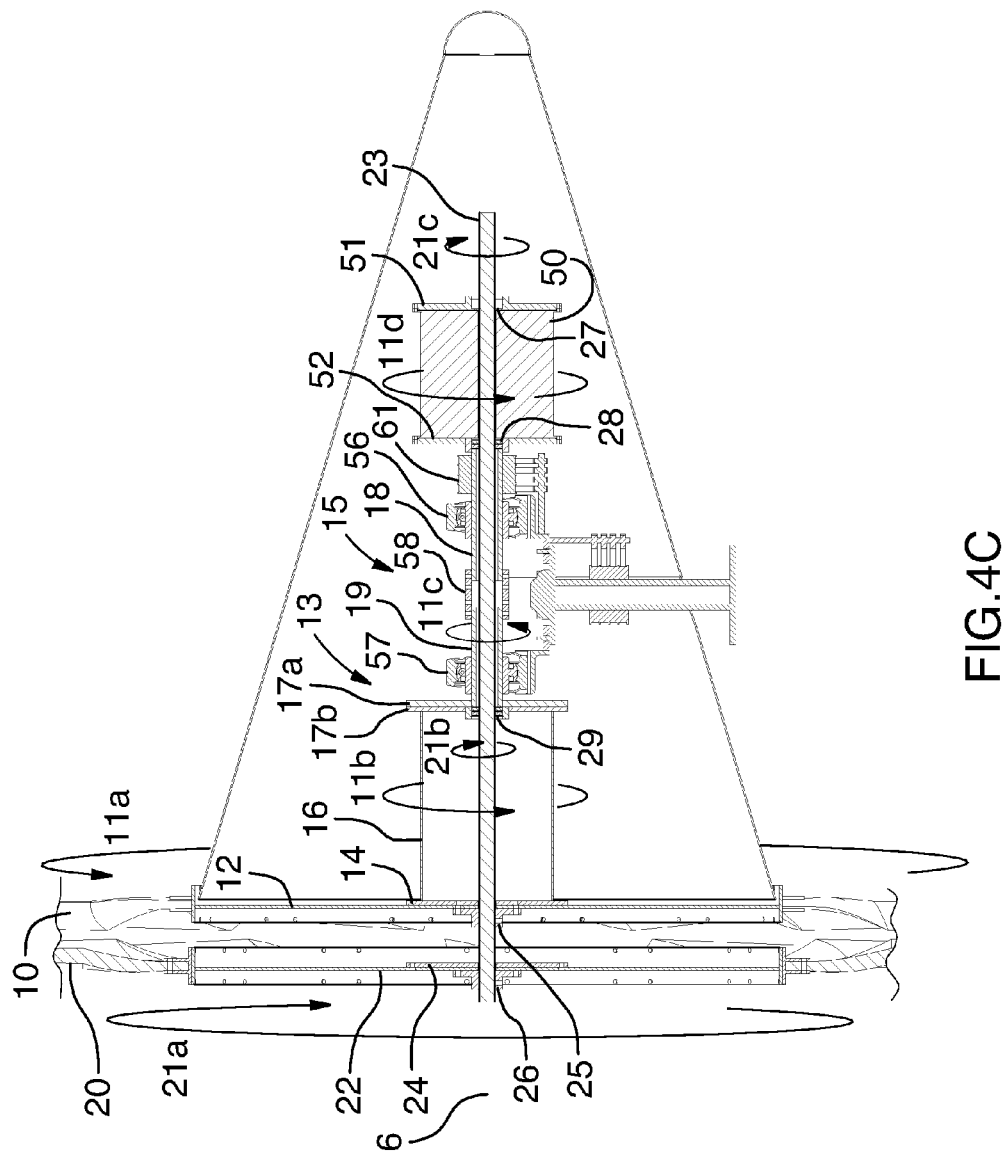
FIG. 4C is an enlarged partial side sectional view as shown in FIG. 4*b;*

Referring to FIGS. 4A to 4C, the second shaft 23 is journaled within the first shaft 13. Both the first and second shafts 13, 23 are concentric with the horizontal axis 6. The first section 15 of the first shaft 13 comprises a front portion 18 and a rear portion 19 connected to one another via the shaft coupler 58. The shaft coupler 58 is keyed to both the front portion 18 and rear portion 19; however, many other suitable arrangements can be contemplated, for example right and left hand threaded connections. The front portion 18 is journaled within the front bearing block 56. The slip rings 61 of the first rotational power coupling 60 are fixedly attached to the front portion 18 forward of the bearing block 56. The front portion 18 is fixedly attached to the rear endplate 52 of the alternator 50; this causes the alternator to rotate concurrently with the first shaft 13. The rear portion 19 of the first shaft 13 is journaled within the rear bearing block 57 and fixedly attached to the front flange 17a, which in turn is bolted to the rear flange 17b. This connects the first section 15 to the second section 16 of the first shaft 13. The second section 16 is hollow and, as previously described, has a larger diameter than the first section 15 to impart additional stiffness to the shaft. The second section 16 is fixedly attached to the first hub 12 by means of first hub flange 14. In this manner, rotation of the first hub 12 by the first set of blades 10 in a first direction, as shown at 11a, is transmitted to the second section 16 of the first shaft 13, as shown at 11b, and thence to the rear portion 19 of the first section 15, as shown at 11c. This rotation is transmitted via the shaft coupler 58 to the front portion 18 and then to the alternator 50, as shown at 11d. The alternator 50 therefore rotates in the same direction as the first set of blades 10.

The second shaft 23 is attached to the second hub 22 by means of a second hub bearing 26 that is mounted to the second hub 22 via a second hub flange 24. The second shaft 23 is journaled within a first hub bearing 25 provided on the first hub 12, allowing it to pass through the hub and rotate independently thereof. The second hub bearing 26 is keyed to the second shaft 23; the shaft therefore rotates with the second hub 22 in the second direction 21, as indicated by arrows 21b and 21a, respectively. Due to this arrangement, the second shaft 23 does not rotate within the second hub bearing 26; however, a bearing is still provided for centering of the second shaft 23 in a like manner to the first hub bearing 25 and to permit ready disassembly and removal of the second shaft 23 from the second hub 22. Other arrangements can be contemplated that would achieve the same result. The second shaft 23 passes through the hollow center of the second portion 16 of the first shaft 13 and is journaled within third shaft bearing 29, which is mounted to the flange 17b. The second shaft 23 is therefore permitted to pass through the flanges 17a, 17b and into the first portion 15 of the first shaft 13. The shaft is similarly journaled within a second shaft bearing 28 that is mounted to the rear endplate 52 and a first shaft bearing 27 that is mounted to a front endplate 51. The second shaft 23 therefore passes through the alternator 50 and is permitted to rotate in the second direction 21, as indicated by arrows 21c. The second shaft 23 therefore rotates in the opposite direction to the alternator 50.

Figures 6A, 6B:
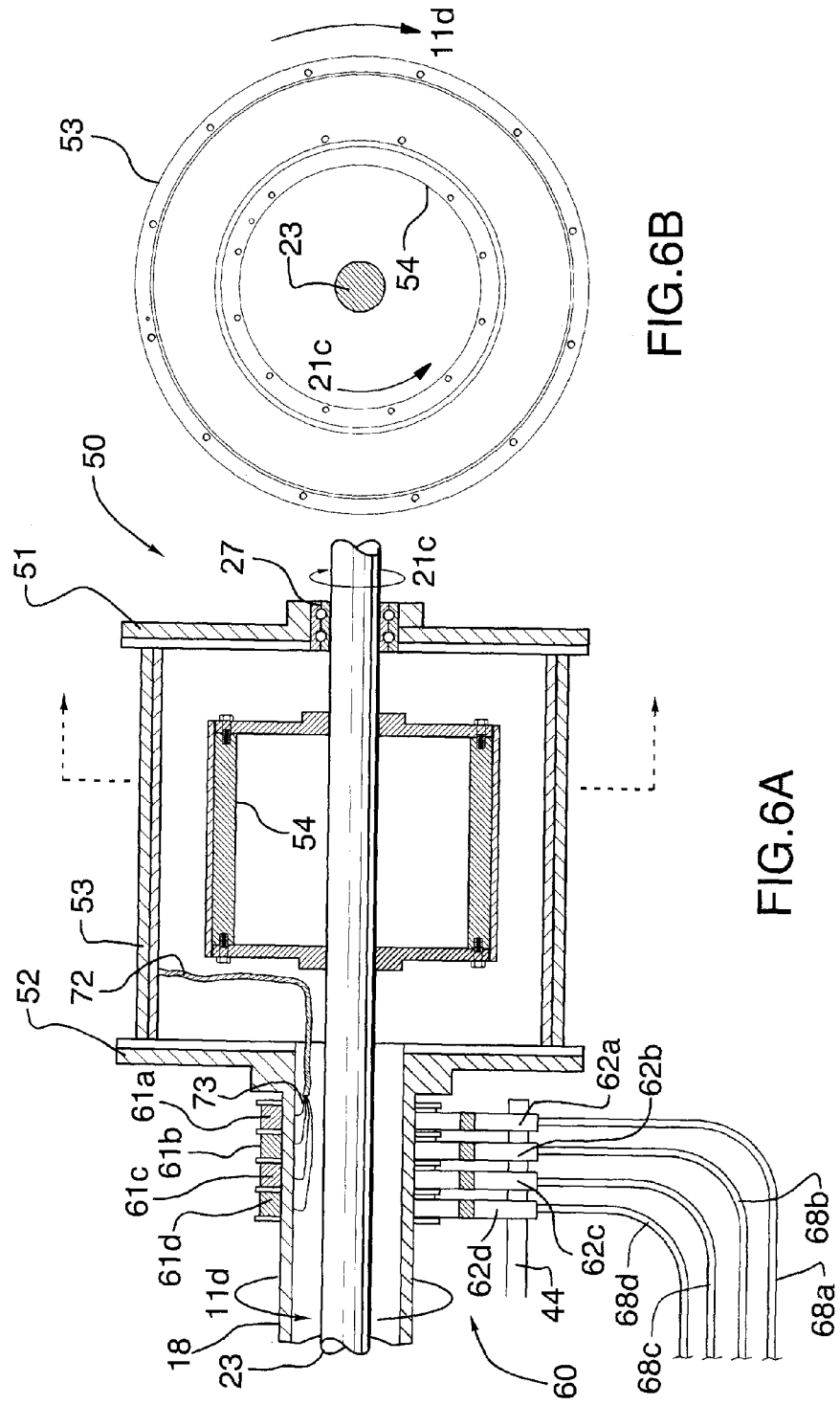

Referring to FIGS. 6A and 6B, the alternator 50 contains an alternator stator 53 and alternator rotor 54 for the purposes of generating electricity. The stator 53 is mounted within the alternator 50 between the endplates 52, 51 for movement in the first direction 11, as indicated by arrow 11d, with the front portion 18 of the first shaft 13. The second shaft 23 is journaled within front shaft bearing 27 provided in the front endplate 51; the second shaft bearing 28 (shown in FIG. 4C) has been omitted from this view for clarity, but would normally be provided in rear endplate 52 as previously described. The rotor 54 is mounted to the second shaft 23 for movement in the second direction 21, as indicated by arrows 21c. This means that the stator 53 and rotor 54 rotate in opposite directions to one another. As is known to persons skilled in the art, electricity is generated by relative movement between the stator 53 and rotor 54; the speed of this relative movement determines the power generated by the alternator 50. By rotating the stator 53 and rotor 54 in opposite directions to one another, the relative movement is doubled, thereby increasing the amount of power generated for a certain torque provided by the first and second sets of blades 10, 20 without the need for a transmission. This simplifies the design and maintenance of the apparatus.

Figure 3D:
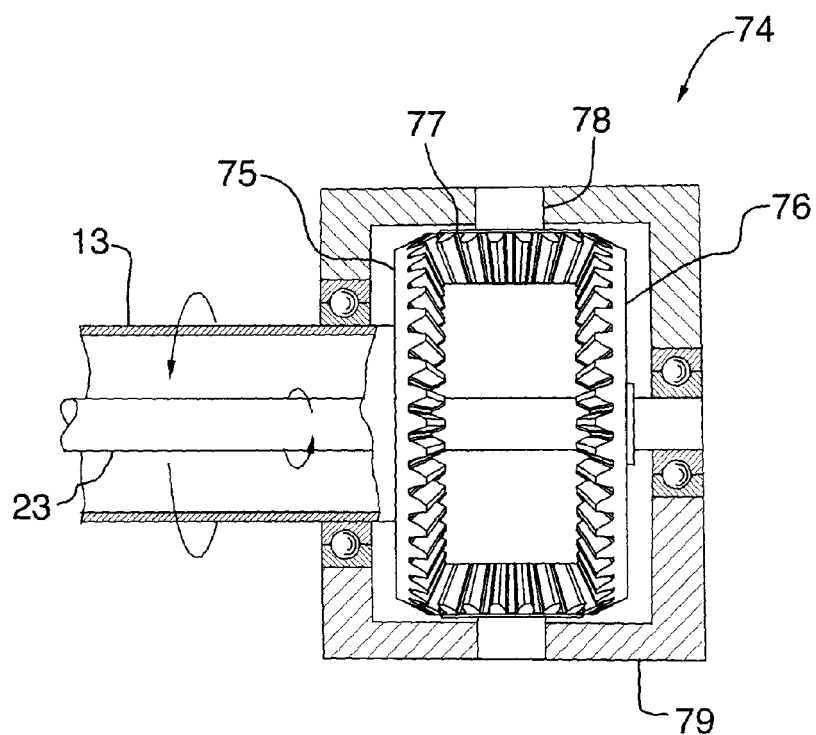
FIG. 3D is a side sectional view of a synchronizer for use with the present invention.

When the synchronizer 74 is provided, as shown in FIG. 3A, the rotational speed of the first and second shafts 13, 23 is mechanically interlocked at a 1:1 ratio; this prevents the rotational speed of the first and second sets of blades 10, 20 from deviating from one another, particularly during periods of fluctuating wind velocity. This can lead to improvements in power output, since higher relative rotational speeds are maintained, and/or in steering, since the aerodynamics of the two sets of blades in co-operation with the nose cone remain more consistent. However, even when the synchronizer 74 is provided, it is advantageous that the two sets of blades 10, 20 are designed to operate at similar speeds, since this reduces the load on the synchronizer and thereby increases its lifetime. One embodiment of a synchronizer 74 is shown in FIG. 3D and comprises a fixed housing 79 containing a pair of beveled gears 75, 76 each mounted co-axially to one of the shafts 13, 23, respectively, and interconnected by a set of spider gears 77 rotationally mounted on stub shafts 78 attached to the interior of the housing 79 perpendicular to the shafts 13, 23. Rotation of the first shaft 13 and beveled gear 75 reacts against the housing 79 through the spider gears 77, which causes an opposite rotation of the beveled gear 76 and second shaft 23. Persons skilled in the art will be able to readily determine other suitable arrangements that can mechanically interlock the two shafts 13, 23 in a 1:1 ratio, for example planetary gear arrangements.

As shown in FIG. 6A, the electrical power generated by the alternator 50 is transmitted via alternator cable 72, which passes into the hollow interior of the front portion 18 of the first shaft 13 adjacent the second shaft 23. The alternator cable 72 then splits into four wires 73, which in turn are each connected to one of the independent, electrically isolated channels of the slip rings 61a-d. An additional slip ring may also be provided for connection to a lightning arrestor (not shown). The slip rings 61a-d are fixedly mounted to the exterior of the front portion 18 of the first shaft 13. Since the stator 53 of the alternator 50 turns in unison with the front portion 18, there is no twisting of the cable 72. The remainder of the first rotational power coupling 60 then functions as previously described with reference to FIG. 3C in order to transmit the power carried by the wires 73 of the cable 72 through the slip rings 61a-d to the brushes 62a-d that are slidingly engaged therewith. The power is then transmitted via the coupling wires 68a-d to the second power coupling (not shown in FIG. 6A or 6B).

The foregoing describes preferred embodiments of the invention only and is meant to be construed in a non-limiting sense. Persons skilled in the art will recognize that there are other embodiments and sub-combinations of the invention that are intended by the inventor to be encompassed by the following claims. It will be appreciated that the present invention is susceptible to further modification and change without departing from the fair meaning of the accompanying claims and that certain equivalents or variants may be substituted for claimed elements without affecting the way in which the invention works.

The invention claimed is:

1. A wind powered apparatus having a front for orientation into the wind and a rear, the apparatus comprising:
    a front nose piece;
    a first set of blades rearward of the nose piece that rotates in a first direction about a horizontal axis;
    a second set of blades, rearward of the first set of blades, that rotates in a second direction about the horizontal axis, the second direction opposite to the first direction;
    an electricity generating means located within the front nose piece concentric with the horizontal axis and operatively connected to both the first and second sets of blades; and,
    a vertical pivot axis between the first set of blades and the electricity generating means;
    wherein the apparatus further comprises a central shaft concentric with the horizontal axis and connecting the first set of blades, the second set of blades and the electricity generating means, the central shaft comprising a first shaft that has a hollow cross-sectional shape and a second shaft journaled within the first shaft, the first shaft rotatable in the first direction and the second shaft rotatable in the second direction, the first set of blades connected to the first shaft and the second set of blades connected to the second shaft, wherein the electricity generating means is connected to both the first and second shafts, the electricity generating means comprising a stator and a rotor, each of which is mutually exclusively connected to either the first or second shafts for concentric rotational movement in opposite directions relative to one another.

2. The apparatus according to claim 1, wherein the nose piece is generally conical, comprising a frusto-conical body and a rounded blunt front tip.

3. The apparatus according to claim 2, wherein the frusto-conical body has a front end having a first diameter and a rear end having a second diameter larger than the first diameter.

4. The apparatus according to claim 3, wherein the ratio of the first diameter to the second diameter is in the range of from 0.05 to 0.45.

5. The apparatus according to claim 3, wherein the frusto-conical body has a length and wherein the ratio of the length to the second diameter is from 1 to 3.

6. The apparatus according to claim 3, wherein the first set of blades has a diameter and wherein the ratio of the diameter of the first set of blades to the second diameter of the frusto-conical body is from 2 to 7.

7. The apparatus according to claim 1, wherein the blunt front tip has a length and a diameter equal to the first diameter of the frusto-conical body and wherein the ratio of the length of the blunt front tip to the diameter of the blunt front tip is from 0.1 to 1.5.

8. The apparatus according to claim 1, wherein the apparatus has a center of gravity and wherein the center of gravity is between the vertical pivot axis and the first set of blades.

9. The apparatus according to claim 1, wherein the apparatus further comprises a synchronizer for maintaining a 1:1 speed ratio between the first and second shafts located forward of the vertical pivot axis within the front nose piece and forward of the electricity generating means.

10. The apparatus according to claim 1, wherein the apparatus further comprises a first rotational power coupling external to the electricity generating means and comprising a set of slip rings concentric with the horizontal axis and a set of brushes slidingly engaged in electrical contact with the slip rings.

11. The apparatus according to claim 1, wherein the first or second sets of blades comprise at least five airfoil blades.

12. The apparatus according to claim 1, wherein the first set of blades is equal in number to the second set of blades.

13. The apparatus according to claim 1, wherein the second set of blades is immediately rearward of the first set of blades.

14. The apparatus according to claim 1, wherein the apparatus does not comprise a tail rearward of the second set of blades.

15. The apparatus according to claim 10, wherein the apparatus further comprises a mounting means for mounting the apparatus to a vertical support structure, the mounting means permitting 360° rotational movement of the apparatus about the vertical pivot axis.

16. The apparatus according to claim 15, wherein the apparatus further comprises a second rotational power coupling concentric with the vertical pivot axis.

\* \* \* \* \*